United States Patent [19]
Kaiser

[11] Patent Number: 5,733,416
[45] Date of Patent: Mar. 31, 1998

[54] PROCESS FOR WATER DISPLACEMENT AND COMPONENT RECYCLING

[75] Inventor: Robert Kaiser, Winchester, Mass.

[73] Assignee: Entropic Systems, Inc., Winchester, Mass.

[21] Appl. No.: 605,383

[22] Filed: Feb. 22, 1996

[51] Int. Cl.⁶ ........................................ B01D 3/42
[52] U.S. Cl. .................. 203/1; 134/12; 134/26; 203/14; 252/194
[58] Field of Search ............... 134/12, 18, 26, 134/42; 203/1, 14, 39; 252/194

[56] References Cited

U.S. PATENT DOCUMENTS

| | | | |
|---|---|---|---|
| 3,395,086 | 7/1968 | Victor | 203/14 |
| 3,903,012 | 9/1975 | Brandreth | 252/194 |
| 4,618,447 | 10/1986 | Seelig | 252/139 |
| 5,089,152 | 2/1992 | Flynn et al. | 252/194 |
| 5,256,329 | 10/1993 | Li et al. | 252/194 |
| 5,417,769 | 5/1995 | Gerard | 134/12 |
| 5,560,861 | 10/1996 | Flynn et al. | 134/40 |

OTHER PUBLICATIONS

Hoffman, R., et al., "Drying of DASD Parts Using Perfluorinated Heterocyclics", International CFC and Halon Alternatives Conference (1993).

*Primary Examiner*—Peter A. Hruskoci
*Attorney, Agent, or Firm*—Cesari and McKenna, LLP

[57] ABSTRACT

Method and apparatus for recycling a water-displacement process fluid that includes an organic liquid and a surfactant, the boiling point of which exceeds that of the organic liquid, maintains a sufficient quantity of organic liquid such that water displaced into the organic liquid is evaporated at least as fast as it is introduced. If the water and the organic liquid are immiscible and exhibit different densities, the resulting condensate can be separated into constituent phases by decanting. The condensed organic liquid and unevaporated surfactant are then available for recycling.

20 Claims, 4 Drawing Sheets

PROCESS FOR WATER DISPLACEMENT AND COMPONENT RECYCLING

This invention was made with Government support under Contract F29601-95-C-0048 awarded by the Department of the Air Force. The Government has certain rights in the invention.

BACKGROUND OF THE INVENTION

1. Field of the Invention

The present invention relates to removing water from solid substrates, and in particular to methods and apparatus for removing water without substantial loss of process liquids.

2. Description of the Related Art

Aqueous and semi-aqueous cleaning processes are commonly employed to remove soils from a wide range of processed articles, such as precision metal parts, electronic components, and optical and electro-optical devices. Typically, the article is immersed in an aqueous bath that includes a surfactant, so that polar soils are solubilized and nonpolar soils emulsified. The cleaned article is then rinsed to remove contaminated water and residual surfactant.

Drying the "water-wet" article frequently is important, since water-induced corrosion or damage from material suspended or dissolved in the water can otherwise result (even if the rinse water is highly purified). But removing water not a simple task. When gathered in small crevices, water resists dislodgment due to its high surface tension, and boils at a relatively high temperature—too high for many delicate parts and devices. Although the temperature necessary to remove water can be lowered by operating at reduced pressures, evaporative drying is still a slow process, and elimination of water from small crevices remains difficult to accomplish. An alternative approach is so-called solvent drying, wherein the article is immersed in a solvent that dissolves the remaining water, carrying it off or boiling azeotropically at an acceptable temperature. These solvents may, however, rapidly become saturated with water, making the process less efficient and ultimately leaving behind a solvent or solvent/water residue. In any case, the resulting solvent/water mixture must either be distilled to remove water from the mixture and facilitate reuse of the solvent, or disposed of at high cost.

A more desirable approach utilizes a volatile liquid to displace the water by preferentially wetting the surfaces of the article. The displaced water is then removed (typically by decanting) from the displacing liquid, in which it is insoluble. As in solvent-drying systems, the solvents used to displace water are typically volatile, raising toxicity concerns, and are often environmentally deleterious as well. For example, chlorofluorocarbons have frequently been employed in this role (see, e.g., U.S. Pat. No. 5,089,152 and references cited therein); these are now recognized as ozone-depleting compounds and their use has been curtailed.

Nontoxic, nonhazardous water-displacement compositions have, however, recently become available. These include a variety of solutions of fluorocarbon surfactants in perfluorinated and hydrofluorinated (including hydrofluoroether) carrier liquids. The surfactant molecules in these solutions tend to congregate at the solid-liquid interface, where they come into contact with residual water. Because of its surface activity, the surfactant displaces water from the solid surface, dispersing it in the fluorocarbon liquid. The carrier liquid exhibits a density (typically 1.5–1.8 g/cm$^3$) substantially higher than that of water (1.0 g/cm$^3$), so that water floats to the surface of the liquid mixture as it accumulates. Following its exposure to the water-displacement composition and removal of residual water, the article is rinsed with a surfactant-free fluorocarbon liquid (typically the carrier liquid of the water-displacement composition) and dried in a vapor degreaser.

The principal limitations of perfluorinated liquids are high cost and undesirable effects on the environment if improperly discharged. These limitations are both addressed by utilizing equipment designed to maximize vapor recovery, thereby minimizing system losses of fluorocarbon process liquids. In a typical arrangement, water is removed from a wet article by immersion in a first chamber containing the surfactant/carrier water-displacement mixture; the parts are then transferred to a second chamber containing the rinse bath to remove excess carrier and surfactant. Both chambers are contained within a common housing, thereby preventing atmospheric losses.

Provision must also be made, however, for maintaining the proper concentration of surfactant in the immersion chamber and recycling of process liquids; water accumulates in the water-displacement mixture during immersion, while surfactant accumulates (at a far lower rate) in the rinse liquid. To avoid needlessly discarding these process liquids they are recycled. Because of the surfactant, water can accumulate in the form of an emulsion; indeed, conditions that are optimal for water displacement can also result in rapid emulsification. Accordingly, the common practice of merely decanting the floating water for disposal can be ineffective; some water will remain in the water-displacement mixture in emulsified form, while otherwise useful surfactant will be needlessly discarded.

DESCRIPTION OF THE INVENTION

BRIEF SUMMARY OF THE INVENTION

In a first aspect, the invention avoids loss of surfactant by distilling the water-displacement composition as water accumulates therein, and decanting water from the resulting condensate. Because water and the water-displacement typically boil at much lower temperatures than the surfactant and the surfactant exhibits a negligible vapor pressure at such temperatures, it does not accumulate in the condensate; accordingly, what is decanted from the condensate is water that is essentially free of surfactant.

In an apparatus embodiment of the invention, a portion of the liquid from an immersion chamber is continuously conducted into a distillation chamber, where both water and carrier liquid are boiled off and condensed in a condensation chamber. The surfactant is nonvolatile under conditions of use and is returned as a concentrated solution to the first chamber. Water may then be decanted from the carrier liquid in the condensation chamber, and the dewatered carrier liquid returned to the first chamber in a manner that preserves the ratio of surfactant to carrier liquid (since depletion of surfactant results in declining performance, while excessive surfactant concentrations lengthen rinsing times).

One potential difficulty with this approach is that it may fail to remove all of the water from the mixture in the distillation chamber at typical working rates of water removal. When the water-wet liquid boils, the vapor pressure of the perfluorinated liquid far exceeds that of the water. If the amount of water in the mixture is at all substantial, it will not evaporate quickly enough to avoid accumulation, since the evaporation rate of water is fixed—and small—with respect to the evaporation rate of perfluorinated liquid.

In a non-recycling system, the result is accumulation of water that is never evaporated; in a recycling system, the water is eventually driven off, but at the cost of enormous cycle times.

For example, current equipment systems designed for distillation 10 of a portion of the water-wet displacement liquid (to provide a vapor zone and not, as in the present invention, to facilitate decanting from a condensate) all suffer from this limitation at commercially realistic operating rates (typically involving weight ratios of displaceable water to water-displacement liquid of at least 1%). The effect is exacerbated by the economic incentive to utilize as little water-displacement mixture as possible in view of its expense, thereby increasing the water load further, and to provide as little heating as possible (to minimize construction and operating expense).

The genesis of this problem can be appreciated from the following table, which compares representative water and vapor pressures in water-containing samples of representative water-displacement carrier liquids:

larger water vapor pressure—the higher operating temperatures may exceed the tolerance of the part being cleaned.

It has been found, however, that dramatically improved performance can be obtained by ensuring that the water remains a small enough fraction of the water-displacement liquid to guarantee its evaporation. In a non-recycling system, the invention drives off water that otherwise would simply remain after all of the water-displacement liquid has been evaporated. In the more preferable environment of a recycling system, the invention drastically reduces cycle times to a degree well beyond what would be expected merely from higher distillation rates.

In particular, in a second aspect, the invention comprises maintaining the weight ratio of water-displacement liquid to displaced water at a sufficiently high value so that water evaporates at a rate at least equal to the entrainment rate. This approach runs counter to intuition and economic motivation, since it requires high distillation rates that necessitate larger quantities of expensive water-displacement liquid to provide the necessary heat-transfer

TABLE 1

| Carrier Liquid | PF-5052 | PF-5060 | PF-5062 | PF-5070 | HFE 7100 | HFE 7200 | VERTREL-XF |
|---|---|---|---|---|---|---|---|
| Dry boiling pt °C. | 50.0 | 57.7 | 72.0 | 84.0 | 59.0 | 76.0 | 76.0 |
| Wet boiling pt °C. | 47.1 | 53.1 | 64.7 | 71.0 | 56.5 | 70.9 | 51.6 |
| Vapor pressure at wet boiling point, torr | | | | | | | |
| Carrier | 680.0 | 652.0 | 575.0 | 517.0 | 680.0 | 519.0 | 658.0 |
| Water | 80.0 | 108.0 | 185.0 | 243.0 | 80.0 | 241.0 | 102.0 |
| Total | 760.0 | 760.0 | 760.0 | 760.0 | 760.0 | 760.0 | 760.0 |
| Vapor Water Content | | | | | | | |
| Mole % | 10.5 | 14.2 | 24.3 | 32.0 | 16.7 | 31.8 | 13.2 |
| Weight % | 0.7 | 0.9 | 1.6 | 2.1 | 1.4 | 3.3 | 1.0 |

The "PF" product series is supplied by 3M: PF-5052 is perfluoro-N-methylmorpholine (PNMM), a heterocyclic perfluorinated alkyl ether; PF-5060 is perfluorohexane; PF-5062 is perfluoro-N-ethylmorpholine (PNEM); PF-5070 is perfluoroheptane. Both HFE products are hydrofluoroethers ("HFEs") supplied by 3M, HFE 7100 being methylperfluorobutyl ether and and HFE 7200 being ethylperfluorobutyl ether. The Vertrel-XF product is a hydrofluorocarbon ("HFC"), namely, dihydroperfluoropentane supplied by E.I. dupont de Nemours & Co. In each case the carrier liquid contains a representative amount of water, resulting in a reduced boiling point relative to the water-free liquid. In each case, at the noted boiling point, the vapor pressure of the carrier liquid far exceeds that of water entrained therein. Accordingly, only a small fraction of the entrained water is vaporized; and unless that fraction equals or exceeds the time-average amount of water introduced, through water-displacement, into the liquid, it will accumulate there or require large cycle times to remove.

The minute size of the water fraction driven off during operation is exemplified by the PF-5052 material. The partial pressure of water is 80 torr, so that in molar terms its vapor fraction is only 80/760=10.5%. However, because the molecular weight of water is so much less than PF-5052, in weight percentage terms its vapor fraction is a mere 0.7%. In other words, normal operating conditions that displace water into the PF-5052 at a typical rate of 1% inescapably exceed the rate at which water can be continuously driven off.

While it is possible to utilize a different carrier liquid (e.g., PF-5070) with a higher boiling point—resulting in a area, as well as greater input of heat energy. In fact, these "investments" are more than recovered by the smaller required cycle times.

For example, the Reactone Model 122424 machine, a recycling drying system supplied by Reactone Ultrasonics, Cumberland, R.I., contains an immersion sump having a volume of about 30 gal, and exhibits an overall distillation rate (for the water-displacement liquid) of 42 gal/hr, or 585 lbs/hr. Since, in the case of PF-5052, water will evaporate at no more than (0.007)(585)=4 lbs/hr or about 0.5 gal/hr, a rate of introduction exceeding this amount—which represents only about 1.7% of the immersion sump volume per hour—will substantially increase cycle times. This is because the evaporation ratio of water to PF-5052 remains fixed, so already-evaporated PF-5052 must be recondensed and reintroduced into the distillation sump in order to facilitate complete water evaporation. In effect, the same water-displacement liquid is condensed and needlessly redistilled merely to drive off the water.

By contrast, under similar assumptions, an exemplary implementation of the present invention utilizes a 4.7 gal immersion sump and a distillation rate of 1,463 lbs/hr. Water therefore evaporates at 1.23 gal/hr, so can be introduced without adverse effect on cycle time at this rate; in other words, a volume of water equal to about 26% of the immersion sump can be successfully displaced and driven off per hour. The relative performances of the above-described systems are compared in the following table, which further includes comparative data for the machine manufactured by Greco Brothers, Inc., Providence, R.I.

| Greco | | | | | |
|---|---|---|---|---|---|
| Load Water Content (vol %) | 38.1% | 10.0% | 5.0% | 2.0% | 1.0% |
| Loads/hr | 0.41 | 1.56 | 3.12 | 7.8 | 15.59 |
| Cycle Time | 146.3 | 38.5 | 19.2 | 7.7 | 3.8 |
| Reactone | | | | | |
| Load Water Content (vol %) | 38.1% | 10.0% | 5.0% | 2.0% | 1.0% |
| Loads/hr | 0.16 | 0.6 | 1.19 | 2.98 | 5.96 |
| Cycle Time | 375 | 100 | 50.4 | 20,1 | 10.1 |
| Present Invention | | | | | |
| Load Water Content (vol %) | 38.1% | 10.0% | 5.0% | 2.0% | 1.0% |
| Loads/hr | 2.7 | 10.29 | 20.59 | 51.47 | 103 |
| Cycle Time | 22.2 | 5.8 | 2.9 | 1.2 | 0.6 |

As may be appreciated by the foregoing figures, the substantial decreases in cycle time achieved by the present invention cannot be explained merely by its larger distillation rate. Instead, the invention fundamentally alters the manner in which water-wet fluid is processed for recycling; by maintaining, at any particular distillation rate, a ratio of displaced water to displacement liquid at or below the vapor fraction of water as it is distilled, the water will be driven off as it is accumulated; cycle times will not be lengthened by the need to redistill process liquid merely to drive off the water.

Accordingly, in an implementation of this second aspect, the invention comprises a technique for recycling a process fluid that includes a water-containing organic liquid and a surfactant, the boiling point of which substantially exceeds that of the water-containing organic liquid. A sufficient quantity of organic liquid is maintained such that, when the water-containing organic liquid is boiled, water evaporates at a rate at least equal to its rate of introduction into the organic liquid. If the water and the organic liquid are immiscible and exhibit different densities, as they typically will, the resulting condensate can be separated into constituent phases merely by decanting. The condensed organic liquid as well as a concentrated solution of surfactant are then available for recycling.

More broadly, the invention in this aspect comprises a method for cleaning an article and drying it by water displacement. The article is first cleaned in a manner that results in deposition of water thereon; for example, the article can be washed in a detergent cleaning solution, followed by a water rinse. The wet article is immersed in a process vessel containing a water-displacement composition that comprises an organic liquid and a surfactant, thereby entraining water in the water-displacement composition at an entrainment rate. Displacement of water can be accelerated by sonication with ultrasound, mechanical shear, spraying, etc. The water-containing water-displacement composition is brought from the process vessel to a distillation vessel, where a sufficient ratio of organic liquid to entrained water is maintained such that, at a distillation temperature sufficient to boil the water-containing organic liquid but insufficient to boil the surfactant, water evaporates at a rate at least equal to the entrainment rate. Vapor from distillation condenses in a condensation vessel, where the organic-liquid and water phases are separated. The condensed water is free of process liquids, and so can be discarded or used in other applications; the organic-liquid phase is returned to the distillation vessel so as to maintain therein a composition having a substantially constant ratio of organic liquid to surfactant. This composition is returned from the distillation vessel to the process vessel. By removing both water and organic liquid from the condensation vessel at a rate not exceeding their respective condensation rates, the method can be carried out in an automated fashion without continuing attention to variations in composition, since these will not change as a consequence of system design.

The method can also include immersing the article, following water displacement, in a rinse vessel containing the organic liquid in order to remove residual surfactant, following which the article may be air dried. Pure organic liquid may be provided to the rinse vessel by diverting a portion of the flow from from the condensation vessel to the distillation vessel. By conducting overflow from the rinse vessel to the distillation vessel, residual surfactant removed from treated articles is retained in the system, further contributing to maintenance of proper reagent ratios.

The invention also concerns apparatus for carrying out the foregoing methods.

Suitable organic water-displacement liquids include highly fluorinated liquids, perfluorinated liquids and hydrochlorofluorocarbon ("HCFC") liquids. (As used herein, the term "perfluorinated" refers to a chemical group in which all carbon-hydrogen bonds in the hydrocarbon analog have been replaced with carbon-fluorine bonds; the term "highly fluorinated" refers to a compound containing an average ratio of one fluorine atom to each carbon atom.) Alternatively, the organic liquid can be a hydrocarbon (such as heptane or hexane), or a low-viscosity polysiloxane. In all cases surfactants exhibiting finite solubility and having an appropriate hydrophile/lipophile balance ("HLB") are employed.

In a third aspect, the invention utilizes novel combinations of surfactants and carrier liquids to effect water displacement. In the past, water-displacement processes have employed perfluorinated liquids with highly soluble, but expensive, fluorinated carriers. It has been found, however, that similarly effective results are obtained using traditional, non-fluorinated surfactants combined with HFC or HFE carrier liquids. Although such surfactants are only weakly soluble in HFC or HFE liquids, the amounts required for water displacement are sufficiently small as to render the combination wholly adequate.

BRIEF DESCRIPTION OF THE DRAWINGS

The ensuing description of the invention will be understood more readily from the accompanying drawings, in which.

DETAILED DESCRIPTION OF THE PREFERRED EMBODIMENTS

Figure 1:
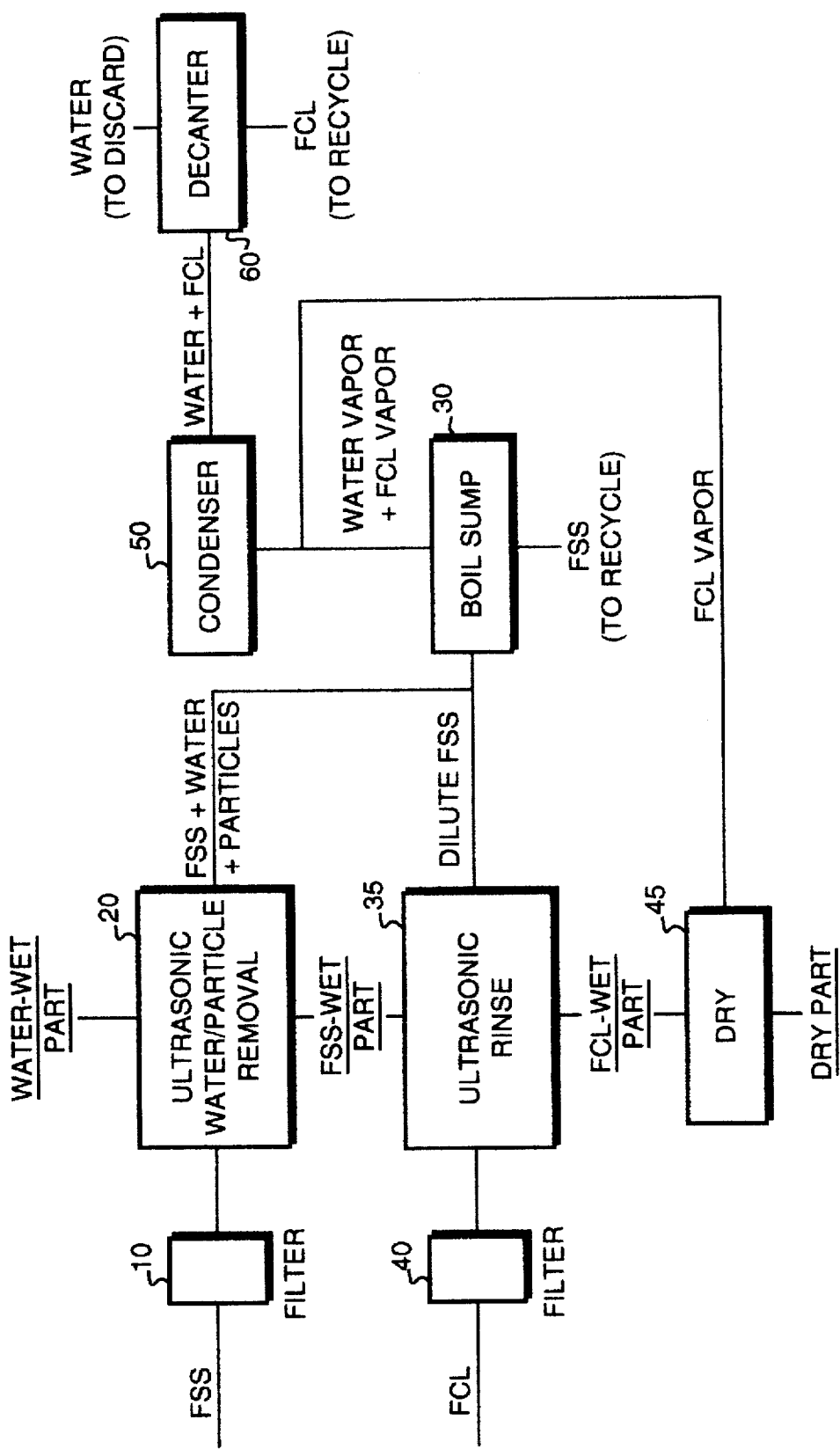
FIG. 1 schematically illustrates the primary process steps of the invention utilizing fluorinated liquids.

Refer first to FIG. 1, which illustrates operation of a representative embodiment of the invention utilizing a fluorocarbon carrier liquid ("FCL") and a fluorocarbon surfactant combined therewith to form a fluorocarbon surfactant solution ("FSS"). The water-wet article or part is combined with fresh FSS, which has been run through a filter 10, in a water-displacement step 20. In this step, surfactant preferentially wets the surface of the part, displacing water into the bulk FSS.

The result of step 20 is a part wetted with surfactant and FSS now contaminated with water and soils, such as particles, that were not previously removed from the part. This mixture is conveyed to a boil sump 30. The FSS-wet part is subjected to an ultrasonic rinse in step 35 (in a dedicated vessel or in the water-removal vessel after contaminated FSS is removed). For this purpose, pure FCL is introduced through a filter into the rinse vessel. The resulting solution of dilute FSS is also conveyed to boil sump 30. The part, now free of surfactant but wet with FCL, is dried in FCL vapor.

In the boil sump, heat is applied to the incoming liquid mixtures (FSS contaminated with water and soils, and dilute FSS from the rinse step) so as to boil FCL and water but not surfactant, which has a boiling point higher than that of the water/FCL mixture (and typically higher than water or FCL in isolation). To this vapor may be added the evaporated FCL from drying step 45. Vapor is condensed in a condenser 50, and FSS accumulating in boil sump 30 is filtered and recycled for reuse in step 20. The water and FCL have different densities, and are conveyed in liquid form to a decanter 60 for separation. FCL is recycled to step 35 and water is discarded or utilized for unrelated purposes.

Figure 2:
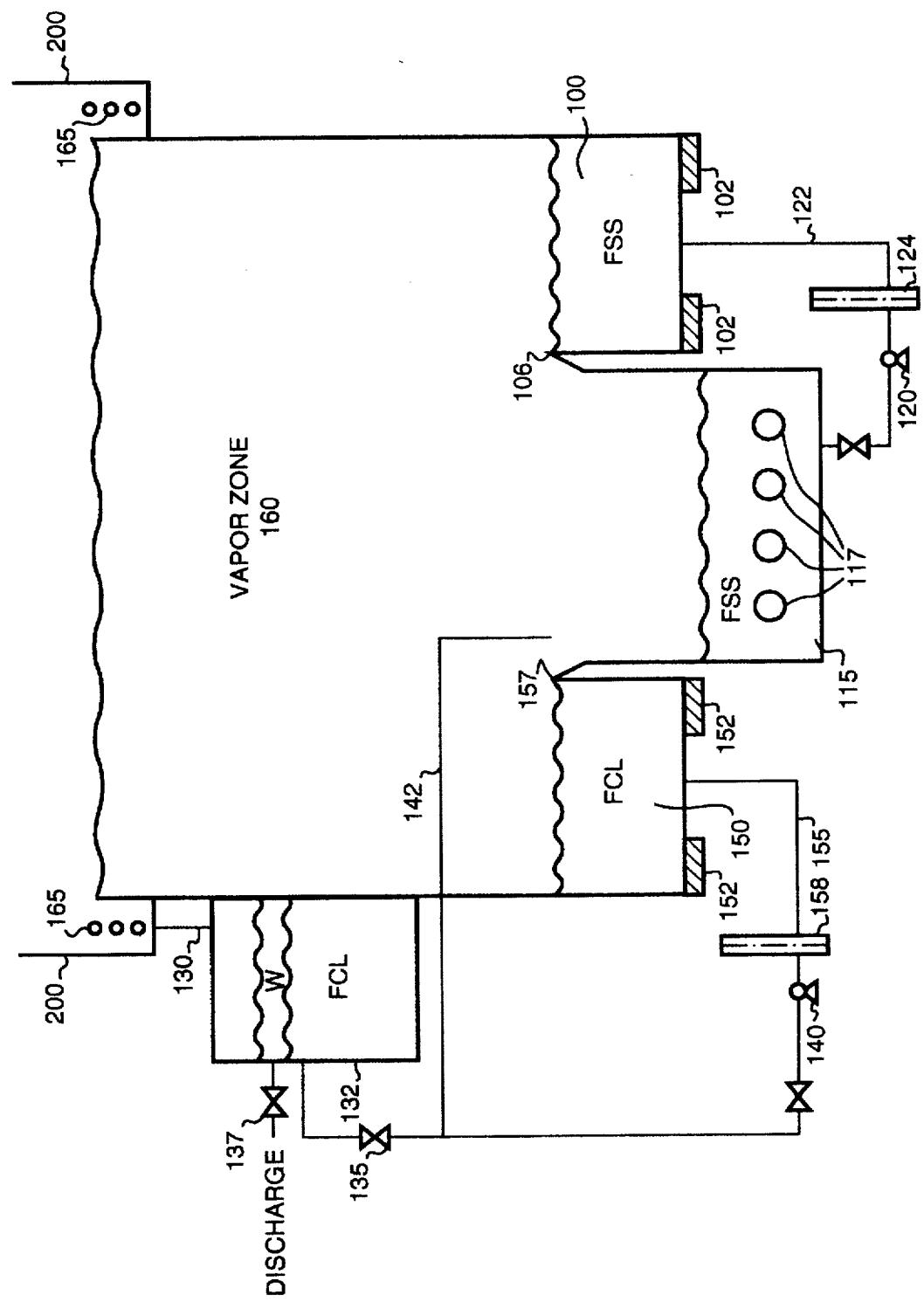
FIG. 2 schematically illustrates a representative hardward implementation of the present invention.

This general process can be implemented in the form of a self-regulating apparatus designed to minimize reagent loss and maintain proper concentrations of process liquids. As shown in FIG. 2, such an apparatus includes an immersion sump 100 for containing the FSS and receiving water-wet articles for dewatering. A set 102 of ultrasonic transducers acoustically agitates the liquid to assist in the water-displacement process. As more articles are immersed in sump 100, the amount of water in the FSS grows. Accordingly, overflow FSS is continuously conducted from sump 100 to a boil sump 115 by means of a simple weir arrangement 106 or through an outlet conduit. A set 117 of heating elements boils the FSS accumulating in sump 115 at a rate sufficient to evaporate all of the water entrained therein. Excess liquid accumulating in boil sump 115 is returned to sump 100 by a pump 120 via a return conduit 122, preferably passing through a membrane filter assembly 124.

Vapor generated in boil sump 115 rises to a condenser 165. The condensate is conducted, via a conduit 130, to a condensate receiving tank 132. Because the density of water is typically less than the FCL materials contemplated herein, the water gathers in a discrete layer W floating above the FCL. A pair of outlet valves 135, 137 are strategically located along the vertical extent of tank 132 such that, under normal operating conditions, only water passes through valve 137 and only FCL through valve 135. When valve 135 is open, FCL under gravity-feed conditions flows from tank 132 at a rate approximating the rate of condensation, but in any case sufficiently little to avoid drainage past the FCL region. The withdrawn FCL is returned to boil sump 115 via a conduit 142.

As discussed below, it is possible to utilize water-displacement liquids having densities less than that of water. In such circumstances, the relative orientation of valves 135, 137 are reversed, so that the floating water-displacement liquid is returned to boil sump 115 and the underlying water removed from the system.

Although the FSS-wet part can be rinsed in sump 100 by draining the sump of FSS and filling it with fresh FCL, preferably a separate tank 150, filled with FCL and equipped with an ultrasonic transducer 152 to assist in dissolving residual surfactant, is utilized instead. A splitter, or a pump 140, diverts a portion (preferably a large portion, on the order of 90%) of the return flow to tank 150 through a conduit 155. The liquid is filtered through a filter 158, and the mixture of FCL and dilute surfactant from tank 150 is conveyed to sump 115 over a weir 157, preferably at a rate approximating the deposition of liquid into rinse tank 150. In this way, surfactant, which wets the article during the displacement process and is therefore withdrawn from sump 100 when the article is removed, can be returned ultimately to sump 100 so as to maintain a substantially constant concentration.

It is also preferred to remove FCL from the article following rinse in a drying zone formed by the vapor zone 160, the top of which is defined by condenser 165 (located near the top of the system). The result of constant removal of vapor through conduit 130 and condensation of remaining vapor in the region below coils 160 is an equilibrium vapor gradient that falls off entirely in the region that the coils surround.

By judiciously adjusting the various rates of transfer among containment vessels, nearly all of the process liquids can be retained within the system and reused. All of the recited components are contained within a common housing 200 to prevent environmental losses.

A wide variety of organic liquids and compatible surfactants can be employed to advantage in practicing the present invention. Useful carrier liquids include perfluorinated liquids such as PNMM, PNEM, perfluorohexane and perfluoroheptane; highly fluorinated HFCs such as dihydroperfluoropentane; HFEs such as methylperfluorobutyl ether and ethylperfhorobutyl ether; and HCFCs such as dichloropentafluoropropane (e.g., the AK-225 product supplied by Asahi Glass Co., Tokyo, Japan). To form the water-displacement liquid, these are combined with a surfactant, typically at a concentration of about 0.01 to 0.5 wt %. The surfactant is chosen to exhibit an HLB that renders it compatible with (i.e., well-dispersed or dissolved in) the the carrier liquid. HLB values are commonly expressed as integers ranging from 1 to 20, with low values indicating dominance of nonpolar (lipophilic) regions and high values reflecting strongly polar (hydrophilic) polar or ionic regions. Preferred surfactants exhibit HBL values in the range of 6 to 15.

For perfluorinated carrier liquids, preferred surfactants include hexafluoropropyleneoxide carboxylic acid adduct having 3 to 15 propylene oxide units, and hexafluoroethyleneoxide carboxylic acid adduct having 3 to 15 ethylene oxide units. (Increasing numbers of propylene oxide or ethylene oxide units shift the HLB to higher values.)

It has been found, however, that a far wider range of surfactants may be used in conjunction with highly fluorinated compounds; in addition to the foregoing compounds, it is possible to utilize nonionic, nonfluorinated surfactants such as ethylene or propylene oxide adducts of (i) linear or branched $C_{10}$–$C_{18}$ alcohols or (ii) thioethers. Although these compounds exhibit limited solubilities in HFC and HFE liquids, these are eminently adequate for water removal.

In particular, the following table shows the solubilities of various suitable surfactants in two HFE liquids and one HFC liquid:

TABLE 2

Room-Temperature Solubility in Candidate Carrier Liquids

| Surfactant | HLB | HFE 7100 | HFE 7200 | VERTREL-XF |
|---|---|---|---|---|
| Rhodasurf BC-420 | 8 | 0.131 < x < 0.242 | x < 0.118 | 7.51 < x < 8.5 |
| Rhodasurf BC-610 | 11.4 | x < 0.123 | x < 0.134 | 1.79 < x < 2.5 |
| Rhodasurf BC-630 | 11.5 | x < 0.131 | x < 0.149 | 0.82 < x < 1.5 |
| Rhodasurf BC-530 | 10.5 | 0.134 < x < 0.464 | x < 0.127 | Miscible |
| Rhodasurf LA-3 | 8 | 0.136 < x < 0.399 | 0.139 < x < 1.466 | Miscible |
| Rhodasurf LAN-3 | 8 | 0.135 < x < 0.283 | 0.131 < x < 0.381 | Miscible |
| Rhodasurf LA-7 | 12 | x < 0.19 | x < 0.04 | Miscible |
| Rhodasurf LA-9 | 13.1 | x < 0.30 | x < 0.06 | Miscible | where the Rhodasurf BC and DA materials, supplied by Rhone-Poulenc, are varieties of isodecyl and isotridecyl ethoxylate having different numbers of ethylene oxide units (which accounts for the variation in HLB); and the Rhodasurf LA and LAN materials are mixed linear $C_{11}$–$C_{14}$ alcohol ethoxylates.

The performances of the foregoing surfactant/liquid mixtures were assessed and compared to fully fluorinated formulations using a batch drying method. Specifically, sandwich assemblies consisting of two flat circular magnets 0.5 inch in diameter, separated by a 50×50 mesh stainless wire cloth with the same diameter, were used as test pieces. Prior to each experiment, the part was first extracted with acetone in a Soxhlet extractor and then sonicated in filtered pure fluorinated liquid to ensure clean wetting surfaces. The dry part was then weighed.

The stainless steel wire mesh was centered on a face of a magnet. Water was then added until the face was covered with water. The second magnet was then placed on the top. Water from all exterior surfaces was wiped with a clean tissue paper. The sandwich assembly was then weighed to determine the exact amount of water added.

A 40 ml glass vial (27 mm outer diameter×95 mm long) was filled with 20 ml of filtered cleaning liquid and suspended in an ultrasonic bath. The liquid in the glass vial was first degassed for three minutes. The test piece to be dewatered was then suspended in the glass vial with a paper clip and sonicated at a predetermined ultrasonic power level and temperature for 3 minutes. The part was then air dried and weighed. The difference in the weights before cleaning and after cleaning represents a direct measurement of the amount of water removed. This procedure was repeated with the same part and with fresh liquid until all the water was removed from the test assembly, or up to a maximum of four cleaning steps. The part was then ultrasonically rinsed in pure carrier liquid, air dried and weighed.

The results of the experiments is shown in the following table:

TABLE 3

| Cleaing Liquid | Number of Runs | Temp, °C. | US Power W/liter | Initial Water Weight, gm | Weight % Water Retention After Cycle Number | | | | | | Rinse | Final Water Weight, gm |
|---|---|---|---|---|---|---|---|---|---|---|---|---|
| | | | | | 0 | 1 | 2 | 3 | 4 | 5 | | |
| PF5052 | 2 | 45 | 9 | 0.03544 | 100 | 38.66 | 21.88 | 12.92 | 6.11 | 3.21 | | 0.00107 |
| PF5052 DS | 2 | 45 | 9 | 0.03582 | 100 | (0.33) | | | | | (0.45) | −0.00016 |
| PF5052 | 2 | 45 | 26 | 0.03607 | 100 | 16.32 | 6.68 | 2.89 | 0.24 | | | 0.00009 |
| PF5052 DS | 2 | 45 | 26 | 0.03498 | 100 | (1.30) | | | | | (1.68) | −0.00059 |
| PF5060 | 4 | 50 | 9 | 0.03537 | 100 | 39.48 | 24.19 | 13.85 | 7.91 | 5.67 | | 0.00169 |
| PF5060 + 0.507% R159 | 4 | 50 | 9 | 0.03423 | 100 | 44.92 | 32.14 | 23.46 | 17.56 | | 12.54 | 0.00678 |
| PF5060 + 0.479% R214 (PEG 600) | 2 | 50 | 9 | 0.03563 | 100 | 3.40 | | | | | (0.48) | −0.00017 |
| PF5060 + 0.479% R214 (PEG 600) | 2 | 40 | 9 | 0.03499 | 100 | 11.28 | 3.21 | | | | 0.57 | 0.00020 |
| PF5060 | 4 | 50 | 26 | 0.03578 | 100 | 26.08 | 11.42 | 4.94 | 3.69 | 3.31 | | 0.00085 |
| PF5060 + 0.507% R159 | 8 | 50 | 26 | 0.03453 | 100 | 24.58 | 17.55 | 12.75 | 8.90 | | 4.89 | 0.00169 |
| PF5060 + 0.5% R130 | 4 | 50 | 26 | 0.03528 | 100 | 23.12 | 17.81 | 14.37 | 11.00 | | 8.58 | 0.00302 |
| PF5060 + 0.479% R214 (PEG 600) | 2 | 50 | 26 | 0.03461 | 100 | 0.67 | | | | | (1.10) | −0.00038 |
| PF5060 + 0.507% R159 | 3 | 40 | 26 | 0.03648 | 100 | 10.57 | 5.66 | 2.94 | | | 0.17 | 0.00006 |
| PF5060 + 0.5% R130 | 2 | 40 | 26 | 0.03557 | 100 | 22.71 | 19.66 | 13.00 | 9.96 | | 6.58 | 0.00234 |
| PF5060 + 0.479% R214 (PEG 600) | 2 | 40 | 26 | 0.03511 | 100 | 4.47 | 2.70 | | | | 0.03 | 0.00001 |
| Vertrel XF | 2 | 50 | 9 | 0.03505 | 100 | 16.92 | 2.45 | 0.21 | | | | 0.00008 |
| Vertrel XF + 0.498% R202 | 2 | 50 | 9 | 0.03489 | 100 | 12.79 | 5.41 | 2.25 | | | (0.19) | −0.00001 |
| Vertrel XF + 0.5% R213(PEG 300) | 2 | 50 | 9 | 0.03458 | 100 | 2.57 | 3.02 | | | | 0.02 | −0.00004 |
| Vertrel XF + 0.5% R214(PEG 600) | 3 | 50 | 9 | 0.03518 | 100 | 2.26 | 0.29 | | | | (0.06) | −0.00007 |
| Vertrel XF + 0.106% Rhodasurf DA-530 | 1 | 50 | 9 | 0.03667 | 100 | 0.16 | | | | | (1.50) | −0.00055 |
| Vertrel XF + 0.4% Triton X-100 | 2 | 50 | 9 | 0.03555 | 100 | 1.07 | | | | | (0.47) | −0.00017 |
| Vertrel XF | 2 | 50 | 26 | 0.03563 | 100 | 2.85 | (0.62) | | | | | 0.00014 |
| Vertrel XF + 0.498% R202 | 2 | 50 | 26 | 0.03470 | 100 | 9.15 | 1.73 | | | | (0.15) | −0.00005 |
| Vertrel XF + 0.5% R213(PEG 300) | 2 | 50 | 26 | 0.03505 | 100 | 5.69 | 1.07 | | | | (0.25) | −0.00009 |
| Vertrel XF + 0.5% R214(PEG 600) | 4 | 50 | 26 | 0.03453 | 100 | 1.65 | 0.27 | | | | (0.19) | (0.00006) |
| Vertrel XF + 0.106% Rhodasurf DA-530 | 2 | 50 | 26 | 0.03744 | 100 | (0.42) | | | | | (0.89) | −0.00034 |
| Vertrel XF + 0.4% Triton X-100 | 2 | 50 | 26 | 0.03590 | 100 | 1.95 | | | | | (0.43) | −0.00015 |
| HFE-7100 | 3 | 50 | 9 | 0.03553 | 100 | 31.49 | 20.95 | 14.33 | 8.50 | 5.11 | | 0.00182 |
| HFE-7100 + 0.5% R213 (PEG 300) | 2 | 50 | 9 | 0.03531 | 100 | 29.24 | 20.12 | 11.90 | | | 6.84 | 0.00241 |
| HFE-7100 + 0.5% R214 (PEG 600) | 2 | 50 | 9 | 0.03418 | 100 | 0.10 | | | | | (0.24) | −0.00008 |
| HFE-7100 + 0.1% Rhodasurf BC-420 | 2 | 50 | 9 | 0.03689 | 100 | (1.70) | | | | | (2.21) | −0.00082 |
| HFE-7100 + 0.095% Rhodasurf DA-530 | 2 | 50 | 9 | 0.03665 | 100 | 2.28 | 1.33 | | | | 1.73 | 0.00064 |
| HFE-7100 + 0.1% Rhodasurf LAN-3 | 3 | 50 | 9 | 0.03731 | 100 | 1.18 | 2.83 | | | | 1.01 | 0.00038 |
| HFE-7100 + 0.1% Rhodasurf LA-3 | 2 | 50 | 9 | 0.03643 | 100 | (2.32) | | | | | (2.76) | −0.00101 |

TABLE 3-continued

| Cleaing Liquid | Number of Runs | Temp, °C. | US Power W/ liter | Initial Water Weight, gm | Weight % Water Retention After Cycle Number | | | | | | Rinse | Final Water Weight, gm |
|---|---|---|---|---|---|---|---|---|---|---|---|---|
| | | | | | 0 | 1 | 2 | 3 | 4 | 5 | | |
| HFE-7100 | 2 | 50 | 26 | 0.03515 | 100 | 12.77 | 4.47 | 2.86 | 0.40 | | | 0.00014 |
| HFE-7100 + 0.505% R202 | 2 | 50 | 26 | 0.03495 | 100 | 7.58 | 3.35 | 0.53 | | | (0.15) | −0.00005 |
| HFE-7100 + 0.5% R213 (PEG 300) | 3 | 50 | 26 | 0.03511 | 100 | 4.87 | 1.00 | | | | (0.08) | −0.00003 |
| HFE-7100 + 0.5% R214 (PEG 600) | 2 | 50 | 26 | 0.03474 | 100 | 0.20 | | | | | (0.23) | −0.00008 |
| HFE-7100 + 0.1% Rhodasurf BC-420 | 2 | 50 | 26 | 0.03613 | 100 | (1.34) | | | | | (1.88) | −0.00068 |
| HFE-7100 + 0.095% Rhodasurf DA-530 | 2 | 50 | 26 | 0.03825 | 100 | (0.17) | | | | | (1.07) | −0.00041 |
| HFE-7100 + 0.1% Rhodasurf LAN-3 | 3 | 50 | 26 | 0.03675 | 100 | (0.36) | | | | | (0.81) | −0.00029 |
| HFE-7100 + 0.1% Rhodasurf LA-3 | 2 | 50 | 26 | 0.03687 | 100 | (1.65) | | | | | (2.04) | −0.00075 |

As shown in the table, all experiments were repeated at power levels of 9 and 26 watts/liter. The first set of entries concerns the PF-5052 product, with a fluorinated surfactant (PF-5052DS) and without surfactant as a control. Obviously, the capacity of the carrier liquid to remove water in the absence of the surfactant is quite limited.

This is also true of the other sets of experiments, where control measurements utilizing the pure carrier liquid are shown in each case. It can be seen from the foregoing experimental results that the mixtures of HFC or HFE and nonfluorinated surfactants were clearly superior to the carrier liquid along, and in some cases performed at least as well as fully fluorinated mixtures.

As another alternative, hydrocarbon carriers can be used in conjunction with hydrocarbon-based surfactants. Suitable hydrocarbon carrier liquids include hexane and heptane, both of which are less dense than water. Preferred surfactants for use with such materials include nonionic surfactants such as ethylene or propylene oxide adducts of (i) linear or branched $C_{10}$–$C_{18}$ alcohols or (ii) thioethers.

In another approach, a siloxane compound—i.e., a silicone—is used as a carrier liquid. Suitable siloxanes have low viscosities (preferably less than 5 cps, and ideally around 1 cps), and are used in conjunction with nonionic surfactants such as ethylene or propylene oxide adducts of (i) linear or branched $C_{10}$–$C_{18}$ alcohols or (ii) thioethers at concentrations ranging from 0.1 to 0.5. A suitable example of this type of carrier liquid is the OS-10 product supplied by Dow Corning.

Figure 3:
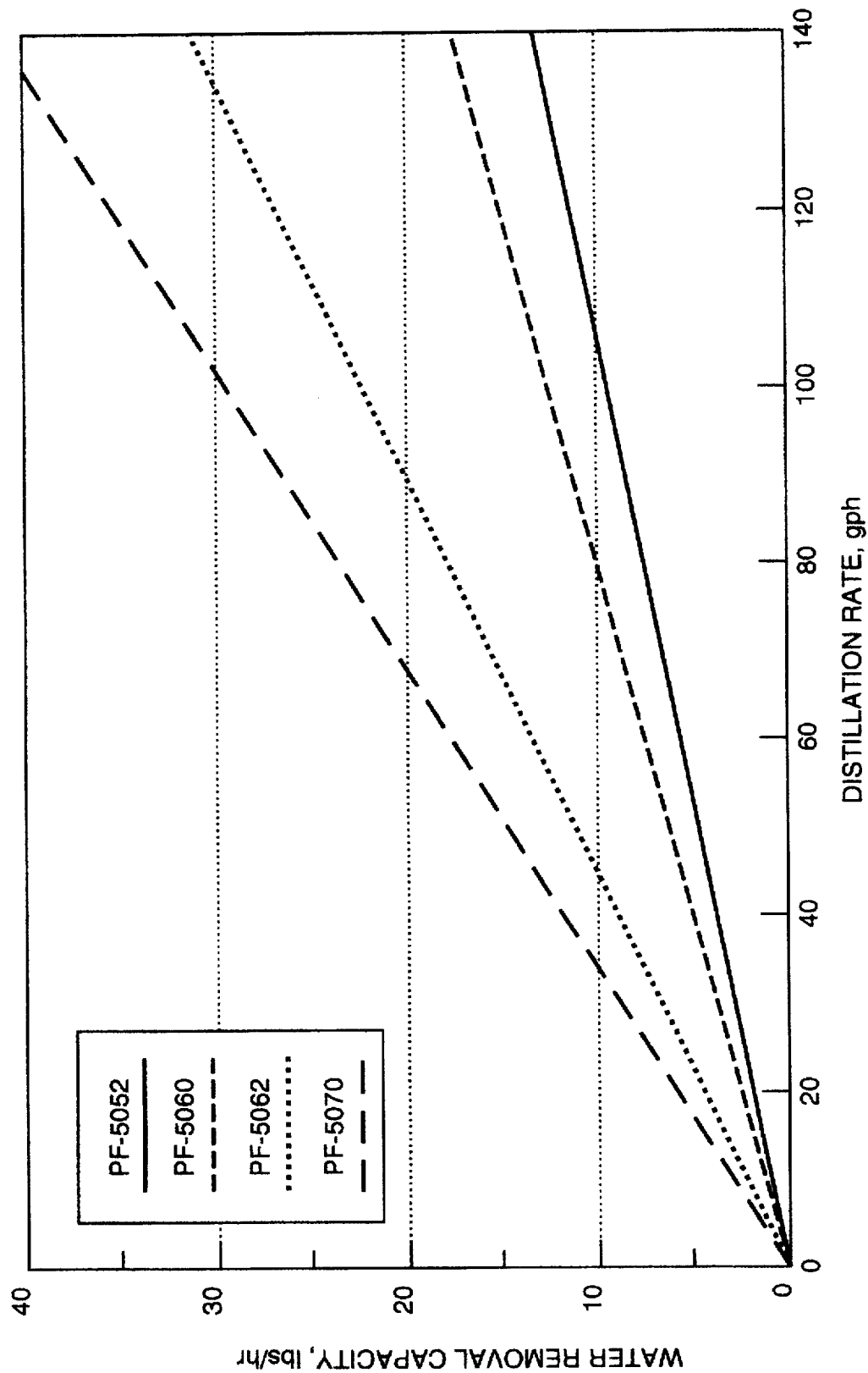
FIG. 3 graphically depicts the relationship between water-removal capacity and distillation rate for various perfluorinated liquids.
Figure 4:
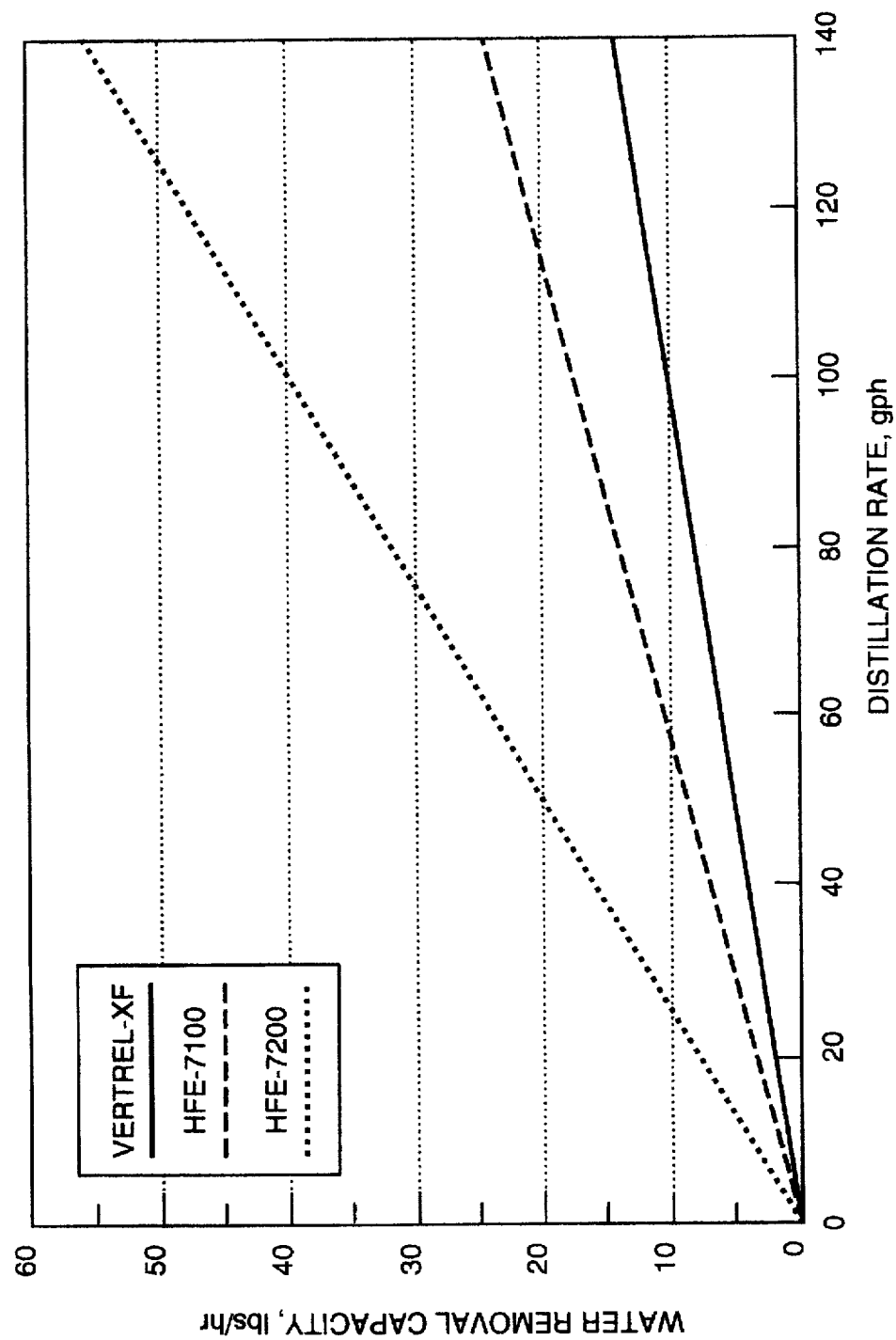
FIG. 4 graphically depicts the relationship between water-removal capacity and distillation rate for various hydrofluorocarbon liquids.

The ratio of carrier liquid to water necessary to ensure, upon boiling, vaporization of all entrained water can be derived from the distillation rate and the rate of water influx. The distillation rate reflects the overall volume of liquid being boiled, and any given distillation rate is associated with a characteristic rate of water removal (based on the respective vapor pressures of water and the carrier liquid). The minimum necessary distillation rate for a given rate of water influx, then, is determined by the distillation properties of the mixed liquid. This is illustrated in FIGS. 3 and 4. For each of the illustrated liquids, increasing the distillation rate increases the amount of water driven off as vapor. Some materials, such as PF-5070, exhibit relatively low vapor pressures, so that relatively large amounts of water (per unit volume of liquid) can be driven off; materials such as PF-5052, with higher vapor pressures, require higher distillation rates to achieve comparable rates of water removal. Based on the known (or maximum anticipated) rate at which water is displaced, the necessary distillation rate reflects a rate of water removal at least equal to the displacement rate.

It will therefore be seen that I have developed a highly efficient system for water removal that resists buildup of water in process liquids. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a water-removal process wherein water is displaced and entrained in a water-displacement composition comprising an organic liquid and a suffactant, the water accumulating in the water-displacement composition at an entrainment rate, a method of recycling the water-displacement composition comprising the steps of:
   a. maintaining a sufficient ratio of organic liquid to entrained water such that, at an operating distillation rate, water is evaporated at a rate exceeding the entrainment rate;
   b. heating the water-containing water-displacement composition to achieve the distillation rate and thereby produce a vapor;
   c. condensing the vapor into a multiphase liquid comprising an organic-liquid phase and a water phase; and
   d. isolating the organic-liquid phase for reuse.

2. The method of claim 1 wherein the ratio is no more than 99:1.

3. The method of claim 1 wherein the organic liquid has a first density and the water has a second density different from the first density such that the multiphase liquid separates into distinct phases, wherein the isolating step comprises decanting one of the phases from the other phase.

4. The method of claim 1 further comprising the steps of:
   a. accumulating, from the water-removal process, the water-containing water-displacement composition in a first vessel comprising an initial supply of water-free water-displacement composition;
   b. condensing the vapor in a second vessel;
   c. returning the organic-liquid phase to the first vessel, thereby maintaining therein a substantially constant ratio of organic liquid to surfactant; and
   d. conducting water-displacement composition from the first vessel to the water-displacement process.

5. The method of claim 1 wherein the organic liquid is a highly fluorinated liquid.

6. The method of claim 5 wherein the surfactant is selected from the group consisting of (a) hexafluoropropyleneoxide carboxylic acid adduct having 3 to 15 propylene oxide units; (b) hexafluoroethyleneoxide carboxylic acid adduct having 3 to 15 ethylene oxide units; and (c) ethylene or propylene oxide adducts of (i) linear or branched $C_{10}$–$C_{18}$ alcohols or (ii) thioethers.

7. The method of claim 1 wherein the organic liquid is perfluorinated.

8. The method of claim 7 wherein the surfactant is selected from the group consisting of (a) hexafluoropropyleneoxide carboxylic acid adduct having 3 to 15 propylene oxide units; and (b) hexafluoroethyleneoxide carboxylic acid adduct having 3 to 15 ethylene oxide units.

9. The method of claim 1 wherein the organic liquid is a polysiloxane.

10. A method of removing water from an article without substantial loss of process liquids, the method comprising the steps of:
 a. immersing the article in a first vessel containing a water-displacement composition that comprises an organic liquid and a surfactant, thereby entraining water in the water-displacement composition at an entrainment rate;
 b. conducting the water-containing water-displacement composition from the first vessel to a second vessel having a top;
 c. maintaining, in the second vessel, a sufficient ratio of organic liquid to entrained water such that, at an operating distillation rate, water is evaporated at a rate exceeding the entrainment rate;
 d. heating the water-containing water-displacement composition in the second vessel to achieve the distillation rate and thereby produce a vapor;
 e. condensing the vapor at the top of the second vessel into a multiphase liquid comprising an organic-liquid phase and a water phase, and conducting the multiphase liquid to a third vessel;
 f. returning the organic-liquid phase to the second vessel, thereby maintaining therein a substantially constant ratio of organic liquid to surfactant; and
 g. returning water-displacement composition from the second vessel to the first vessel.

11. The method of claim 10 wherein the ratio is no more than 99:1.

12. The method of claim 10 wherein the organic liquid is a highly fluorinated liquid.

13. The method of claim 12 wherein the surfactant is selected from the group consisting of (a) hexafluoropropyleneoxide carboxylic acid adduct having 3 to 15 propylene oxide units; (b) hexafluoroethyleneoxide carboxylic acid adduct having 3 to 15 ethylene oxide units; and (e) ethylene or propylene oxide adducts of (i) linear or branched $C_{10}$–$C_{18}$ alcohols or (ii) thioethers.

14. The method of claim 10 wherein the organic liquid is perfluorinated.

15. The method of claim 14 wherein the surfactant is selected from the group consisting of (a) hexafluoropropyleneoxide carboxylic acid adduct having 3 to 15 propylene oxide units; and (b) hexafluoroethyleneoxide carboxylic acid adduct having 3 to 15 ethylene oxide units.

16. The method of claim 10 wherein the organic liquid is a polysiloxane.

17. The method of claim 10 wherein the organic liquid is a hydrocarbon.

18. The method of claim 10 wherein (i) the organic liquid has a first density and the water has a second density different from the first density such that the multiphase liquid separates into distinct phases, (ii) the water condenses at a water-condensation rate, and (iii) the organic liquid condenses at an organic-liquid-condensation rate, and further comprising the step of returning the organic-liquid phase to the second vessel at a rate not exceeding the organic-liquid-condensation rate.

19. The method of claim 10 further comprising the steps of:
 a. rinsing the article in the organic liquid; and
 b. following the rinsing step, returning the organic liquid to the second vessel.

20. The method of claim 19 further comprising the steps of:
 a. immersing the article in a water-displacement composition comprising a soluble amount of a nonfluorinated, nonionic surfactant in a hydrofluorocarbon liquid or a hydrofluoroether liquid so as to remove the water; and
 b. rinsing the article in a composition consisting essentially of the hydrofluorocarbon liquid or the hydrofluoroether liquid.

* * * * *